United States Patent [19]

Inoue et al.

[11] Patent Number: 4,829,333
[45] Date of Patent: May 9, 1989

[54] PHOTOGRAPHIC CAMERA

[75] Inventors: Manabu Inoue, Kobe; Nobuyuki Taniguchi; Yoshiaki Hata, both of Nishinomiya; Takeo Hoda, Kawachinagano; Yoshinobu Kudo, Sakai; Hiroshi Ueda, Toyokawa, all of Japan

[73] Assignee: Minolta Camera Kabushiki Kaisha, Osaka, Japan

[21] Appl. No.: 205,681

[22] Filed: Jun. 13, 1988

Related U.S. Application Data

[63] Continuation of Ser. No. 1,633, Jan. 8, 1987, Pat. No. 4,774,536.

[30] Foreign Application Priority Data

| Jan. 10, 1986 | [JP] | Japan | 61-4081 |
| Jan. 10, 1986 | [JP] | Japan | 61-4082 |
| Jan. 13, 1986 | [JP] | Japan | 61-5501 |
| Jan. 13, 1986 | [JP] | Japan | 61-5503 |

[51] Int. Cl.$^4$ .............................................. G03B 7/00
[52] U.S. Cl. ...................................... 354/412; 354/21; 354/106; 354/195.1; 354/286
[58] Field of Search ............. 354/21, 412, 106, 195.1, 354/286, 105

[56] References Cited

U.S. PATENT DOCUMENTS

| 4,639,111 | 1/1987 | Harvey | 354/195.1 |
| 4,733,263 | 3/1988 | Taniguchi et al. | 354/105 |
| 4,760,413 | 7/1988 | Taniguchi et al. | 354/106 |
| 4,768,047 | 8/1988 | Taniguchi et al. | 354/195.1 |
| 4,774,536 | 9/1988 | Inoue et al. | 354/195.1 |

Primary Examiner—Russell E. Adams
Attorney, Agent, or Firm—Burns, Doane, Swecker & Mathis

[57] ABSTRACT

A photographic camera wherein photographing mode selecting circuit is provided to select a real focal length photographing mode and a pseudo focal length photographing mode for making a print of a field narrower than the field defined by the real focal length photographing mode and output means outputs a pseudo focal length signal corresponding to the pseudo focal length of a photographic lens when pseudo focal length photographing mode is selected. The camera is reset to the real focal length mode if the film is changed, the lens is changed or the main camera switch is turned off.

8 Claims, 14 Drawing Sheets

FAPT: fully opened operture value ns necessary to make a correct print for the pseudo focal length photographing mode can be automatically obtained.

Another object of the present invention is to provide a photographing camera in which the critical shutter speed for the camera shake can be automatically controlled corresponding to the equivalent aperture value and equivalent focal length.

These and other objects and features of the present invention will be apparent from the detailed description of the preferred embodiment described hereinafter.

According to the present invention, there is provided a photographic camera comprising means for selecting a real focal length photographing mode and a pseudo focal length photographing mode for making a print of a field narrower than the field defined by the real focal length photographing mode, output means for outputting a pseudo focal length signal corresponding to the pseudo focal length of a photographic lens when the pseudo focal length photographing mode is selected, and photographing means for photographing according to the pseudo focal length signal.

PHOTOGRAPHIC CAMERA

This application is a continuation of application Ser. No. 001,633, filed Jan. 8, 1987, now U.S. Pat. No. 4,774,536.

BACKGROUND OF THE INVENTION

1. Field of the Invention

The present invention relates to a photographic camera provided with a pseudo focal length photographing mode.

2. Description of the Prior Art

There has been discolosed such a camera employing the pseudo focal length photographing mode in U.S. Pat. No. 4,583,831 and Japanese patent laid open No. 26721/1979 in which a pseudo photographing information is recordable on a negative film. The term of pseudo photographing used herein means that a portion of the picture on a negative is selected and printed on a print with a predetermined magnification value, so that the print has a telephoto or a close-up format.

In a pseudo focal length photographing mode camera in which the light measurement range is selectable between an average light measurement and a spot light measurement, in case the average light measurement is selected and a picture is taken under the pseudo focal length photographing mode (referred to as pseudo mode or PFL mode) when an excessive bright object or a dark object is situated in the scope of the field of view to be recorded on the negative film but is out of the printed range to be printed on the paper, the light measurement value under such condition mentioned above is an unsuitable value for the printed range.

Moreover, there has been known to provide a camera shake warning device in which warning is made when the shutter speed is slower than a predetermined critical speed at which speed there may occur a bad effect of the camera shake on the print. In such cameras, the critical shutter speed used as the reference speed for warning the camera shake is set corresponding to the focal length of the photographic lens. Accordingly, in a camera for which an interchangeable lens is available, there are provided various functions to automatically read the focal length of the interchangeable lens, to decide the shutter speed used as the reference speed of the camera shake warning, to select a desired program for deciding the relation between the shutter speed and aperture value and to control the light emitting angle of a flash light.

On the other hand, in the pseudo focal length photographing mode camera, even if the actual focal length of the lens mounted to the camera is constant, the pseudo focal length may change according to the magnification value of the print, therefore, the critical shutter speed for preventing the effect of the camera shake must be changed depending on the equivalent focal length since the pseudo focal length is changed corresponding to the magnification value at the time of enlarging the size of the photographing object to be printed. However, the conventional camera of this type is not provided with the function of automatically selecting the suitable critical shutter speed for the camera shake warning.

SUMMARY OF THE INVENTION

An essential object of the present invention is to provide a photographing camera in which various informa-

DETAILED DESCRIPTION OF THE PREFERRED EQUIPMENT

Figure 1:
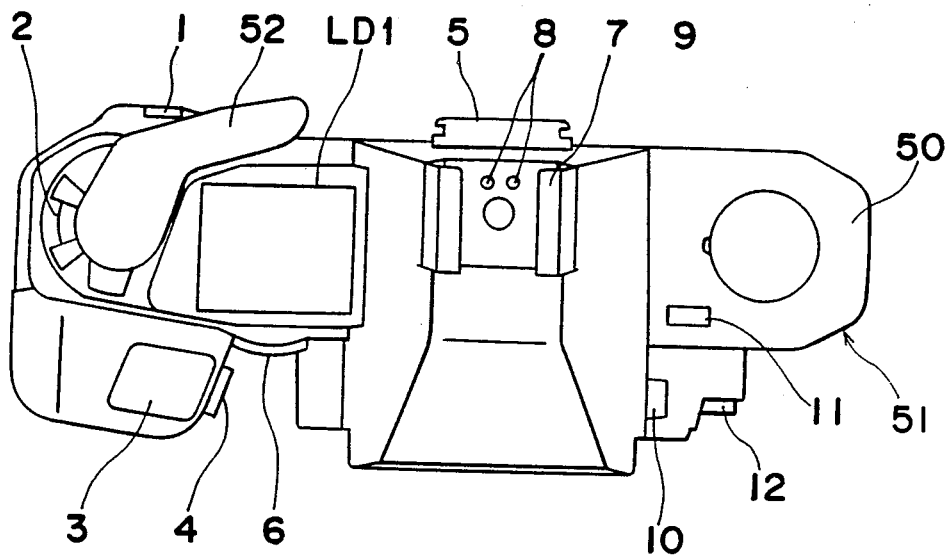
FIG. 1 is a top plan view showing an example of a photographing camera in which the camera according to the present invention is employed.
Figure 2:
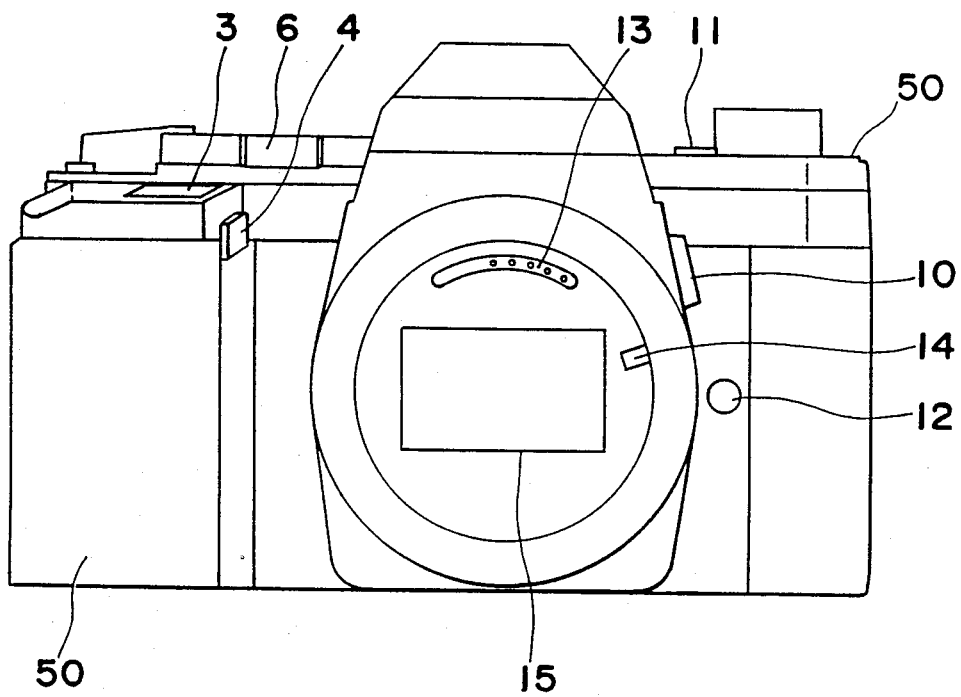
FIG. 2 is a front view of the camera shown in FIG. 1.
Figure 3:
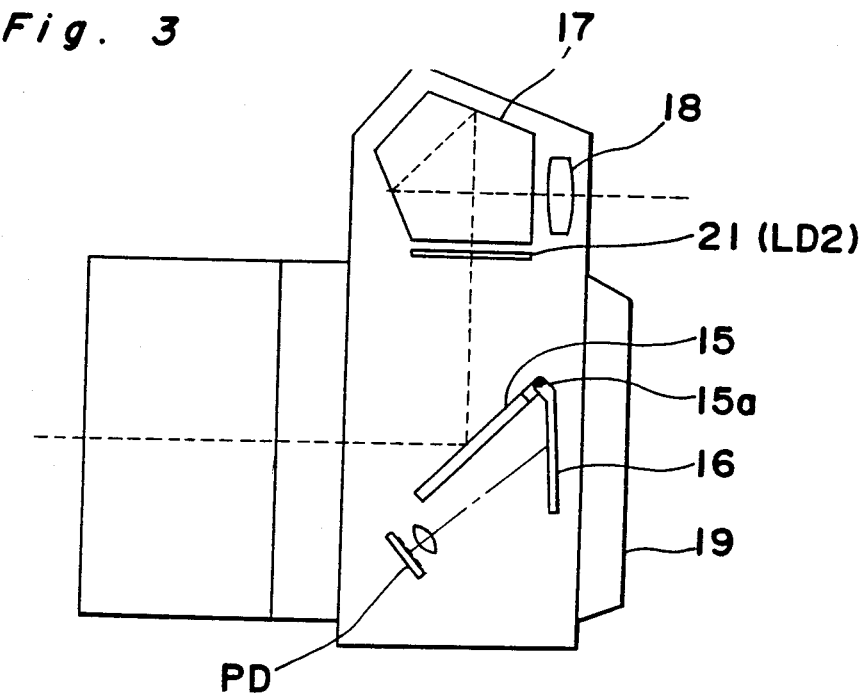
FIG. 3 is a cross sectional view of the camera shown in FIG. 1.

Referring to FIGS. 1 to 3, a single lens reflex camera is shown. A pseudo photographing mode set button 1 is disposed manually operable on the top plate 50 of the camera body 51 for changing the pseudo photographing size (referred to as trimming size hereinafter) of the picture to be printed on a print in case of the pseudo photographing mode. Every one pushing of the pseudo photographing mode set button 1 changes the trimming size in the turn as mentioned below from the real focal length photographing mode to a half size ($\frac{1}{2}$) pseudo photographing mode in a lengthwise shape, a quarter size ($\frac{1}{4}$) pseudo photographing mode in a lengthwise shape, a half size ($\frac{1}{2}$) pseudo photographing mode in a crosswise shape and a quarter size (¼) pseudo photographing in a crosswise shape.

A main switch 2 is disposed on the top plate 50 near a film winding lever 52 so as to be manually operable. When the main switch 2 is turned on, a DC power is supplied to various electronic circuits provided in the camera for enabling various operations of photographing and when turned off, the DC power is cut off to inhibit the operations of the camera. A release button 3 disposed on the front portion of the top plate 50 is operable to be pushed down to a first depth at which light measurement is enabled and to a second depth which is deeper than the first depth and a shutter release is enabled. 4 is a preview button for viewing the depth of field in an actual photographing. When the preview button 4 is pushed, an aperture diaphragm can be controlled to a value for actual photographing. A view finder is indicated at 5.

A shutter speed setting switch 6 is disposed so as to be operable to change the shutter speed Tv step by step in such a manner that upon one push of the switch 6 in a right direction in FIG. 2, the shutter speed can be changed to one step of high shutter speed and upon one push of the switch 6 in a left direction in FIG. 2, the shutter speed can be changed to one step of low shutter speed.

Reference numeral 7 denotes an accessary shoe for detachably mounting a flash device (not shown). 8 denotes a pair of connecting pins 8 for connection of the electric circuit in the flash device to the camera. 9 denotes a light measurement mode switch for changing over between an average light measurement mode and a spot light measurement mode for measuring intensity of light of a particular view field.

An aperture setting switch 10 is disposed so as to be operable to change the aperture value Av step by step in such a manner that upon one push of the switch 10 in the upper direction in FIG. 2, the aperture diaphragm is opened by one step and upon one push of the switch 10 in the lower direction, the aperture diaphragm is closed by one step.

A mode selecting button 11 is disposed on the rear part of the top plate 50 so as to be operable to change the exposure control modes in response to every one push of the mode selecting button 11 in the turn mentioned below from a program mode (referred to as P), to an aperture priority mode (referred to as A mode), a manual mode (referred to as M mode) and a shutter speed priority mode (referred to as S mode).

Reference numeral 12 denotes a lens locking button, 13 denotes connection pins used for transferring the information of a camera lens (not shown) to the camera body 51. 14 denotes an aperture control lever for controlling the aperture size. LD1 denotes a display unit disposed on the top plate 50 for displaying various photographing information.

Inside the camera body 51, there is provided a semi transparent mirror 15 which is rotatable around the pivot axis 15a. Behind the mirror 15, a reflection plate 16 is situated behind the mirror 15 for conducting the light passed through the mirror 15 toward the light detecting element PD. The light reflected by the mirror 15 is passed a focusing plate 21 and reaches a pentagonal roof prism 17 by which the light is transmitted to an eyepiece lens 18 for a view finder of the camera. The focusing plate 21 is made of a LCD (liquid crystal display) unit in which one of the gas plates forming the LCD unit is finished with matte surface so that the focusing plate 21 can act as the display unit LD2 for displaying the photographing information to be displayed in the view finder (not shown).

Figure 4:
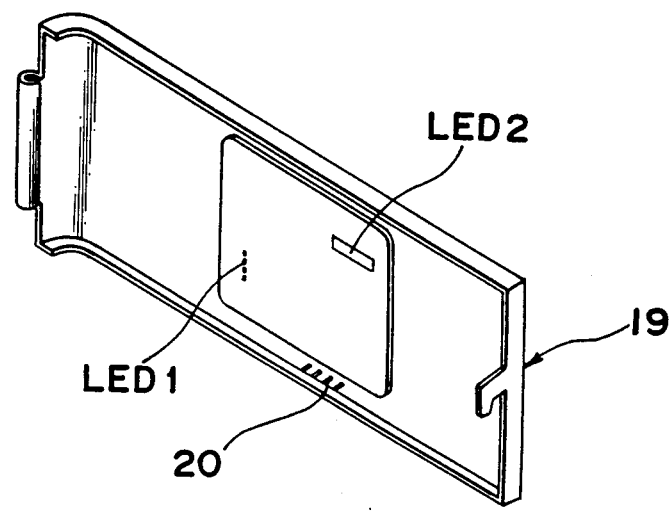
FIG. 4 is a perspective view showing a rear cover used in the camera shown in FIG. 1.

Detail of a rear cover 19 detachably mounted on the rear part of the camera body 51 is shown in FIG 4. in which two groups of light emitting diodes LED1 and LED2 are secured to the inner surface of the rear cover 19. LED 1 and LED 2 act to produce coded light rays representing a pseudo photographing mode information and an equivalent focal length information for imaging the information into the negative in the camera. In case the information is imaged in the negative as a coded pattern, such coded pattern can be printed on a print in a form of numeric characters. 20 denotes connector pins for transferring the signal of the information to LED1 and LED2.

Figures 5, 6:
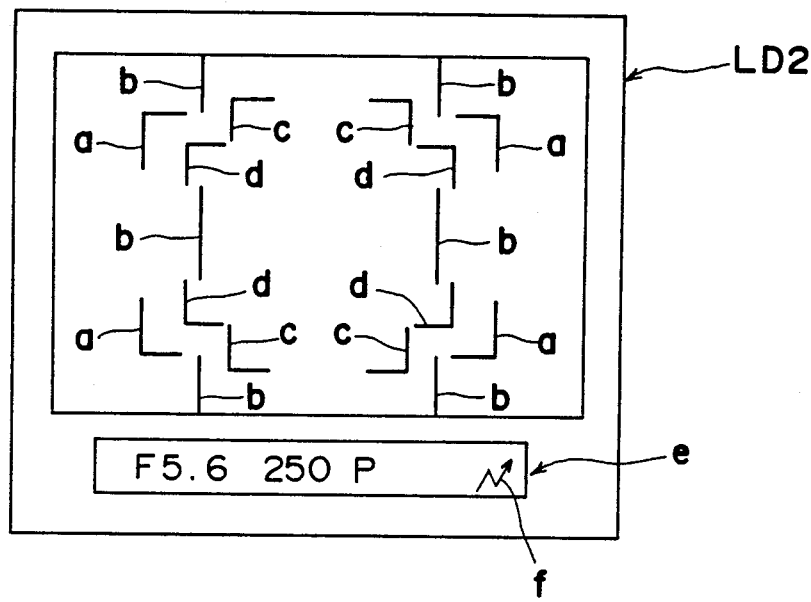
FIG. 5 is a front view of a focusing plate used in the camera shown in FIG. 1, FIGS. 6a to 6c are respective front views of an information display unit used in the camera shown in FIG. 1.

Detail of the focusing plate 21 is shown in FIG. 5 in which the respective segments of the display pattern are depicted at a, b, c and d which represent the four corners of the flame of the respective kinds of the printed range of the half size print and quarter size print. Any one of the groups of the segments a to d can be turned on corresponding to the selection of the trimming size. For example, when the trimming size of the print of the half size with lengthwise shape is selected, the segments a are turned on with the other segments b, c and d turned off, when the trimming size of the print of the quarter size with the crosswise shape is selected, the segments c are turned on with segments a, b and d turned off. The information displayed in the area e is various pseudo photographing information such as aperture value, shutter speed and photographing mode. In the example shown, there are displayed the aperture value F 5.6, shutter speed 1/250 sec. The character P means P mode (program mode). The arrow mark f shows that the charge completion which represents the charge in a main capacitor in a flash circuit is completed.

FIGS. 6(a) to 6(c) show the change of the display of the photographing modes in the area e. The characters A, M and S respectively show the A mode (aperture priority mode), M mode (manual mode) and S mode (shutter speed priority mode).

Figure 7:
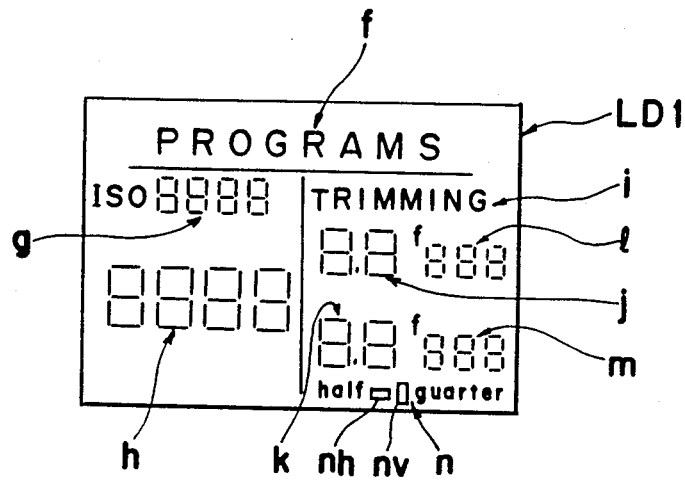
FIG. 7 is a plan view of the display unit used in the camera shown in FIG. 1 with an example of the display contents shown.

FIG. 7 shows the detail of the display unit LD1, wherein a part f is segments for displaying the photographing modes, a part g is segments for displaying the film sensitivity, a part h is segments for displaying the shutter speed, a part i is segments for displaying the character TRIMMING which are turned only at the time of the pseudo focal length photographing mode. A part j is segments for displaying the aperture value and a part k is segments for displaying the equivalent aperture value. A part l is segments for displaying the equivalent focal length and a part m is segments or displaying the equivalent focal length. Both of the parts k and m are displayed only when the pseudo focal length photographing mode is set.

It is possible to make the same print having the same field of view and same depth of field by using the pseudo focal length photographing mode as that of a telephoto lens. The term of equivalent aperture value and equivalent focal length used herein means the aperture value and focal length of the telephoto lens for obtaining the same print having the same field of view and same depth of the field when the pseudo focal length photographing mode is used. It is possible to estimate the telephoto effect and depth of field in the print under the pseudo focal length photographing mode by knowing the equivalent aperture value and equivalent focal length.

A part n is segments for displaying the pseudo focal length photographing mode, wherein the characters "half size" or "quarter size" are selectively displayed depending on which of trimming size is set. For the lengthwise pseudo focal length photographing mode and crosswise pseudo focal length photographing mode, the horizontal square mark nh or the vertical square mark nv is selectively displayed.

Figure 8:
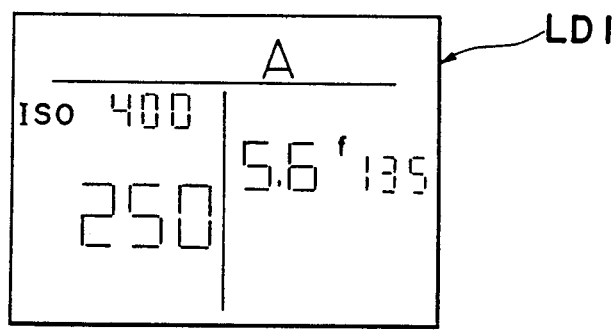
FIGS. 8 and 9 are respective plan views of the display unit showing examples of the displaying data.

An example of the display in the display unit LD1 is shown in FIG. 8 for displaying A mode (aperture priority mode) with the ISO sensitivity 400, shutter speed 1/250 sec., aperture value F 5.6, focal length of the lens f=135 mm. In the example shown in FIG. 8, the pseudo focal length photographing mode is not set.

Figure 9:
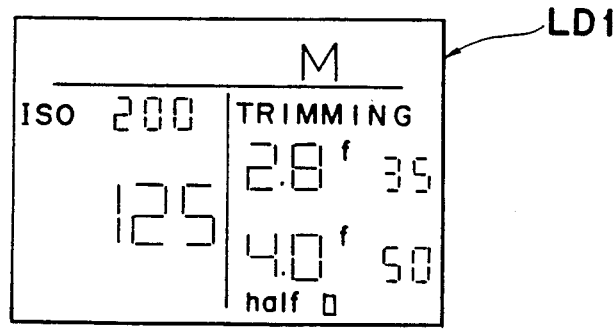

While FIG. 9 shows another example for M mode (manual mode) under the pseudo focal length photographing mode with ISO 200, shutter speed 1/125 sec., aperture value F 2.8, focal length of the lens used f=35 mm, the equivalent aperture value F4 and equivalent focal length f=50 mm. The pseudo photographing is the half size with crosswise shape. When a picture is taken by the camera with the various conditions mentioned in the example shown in FIG. 9 and a part of the image in the negative is printed in a print having the same size of the normal print of the negative, the picture thus printed has the same photographic effect as the picture taken in the normal condition with the lens having the focal length f=50 mm.

Figure 10:
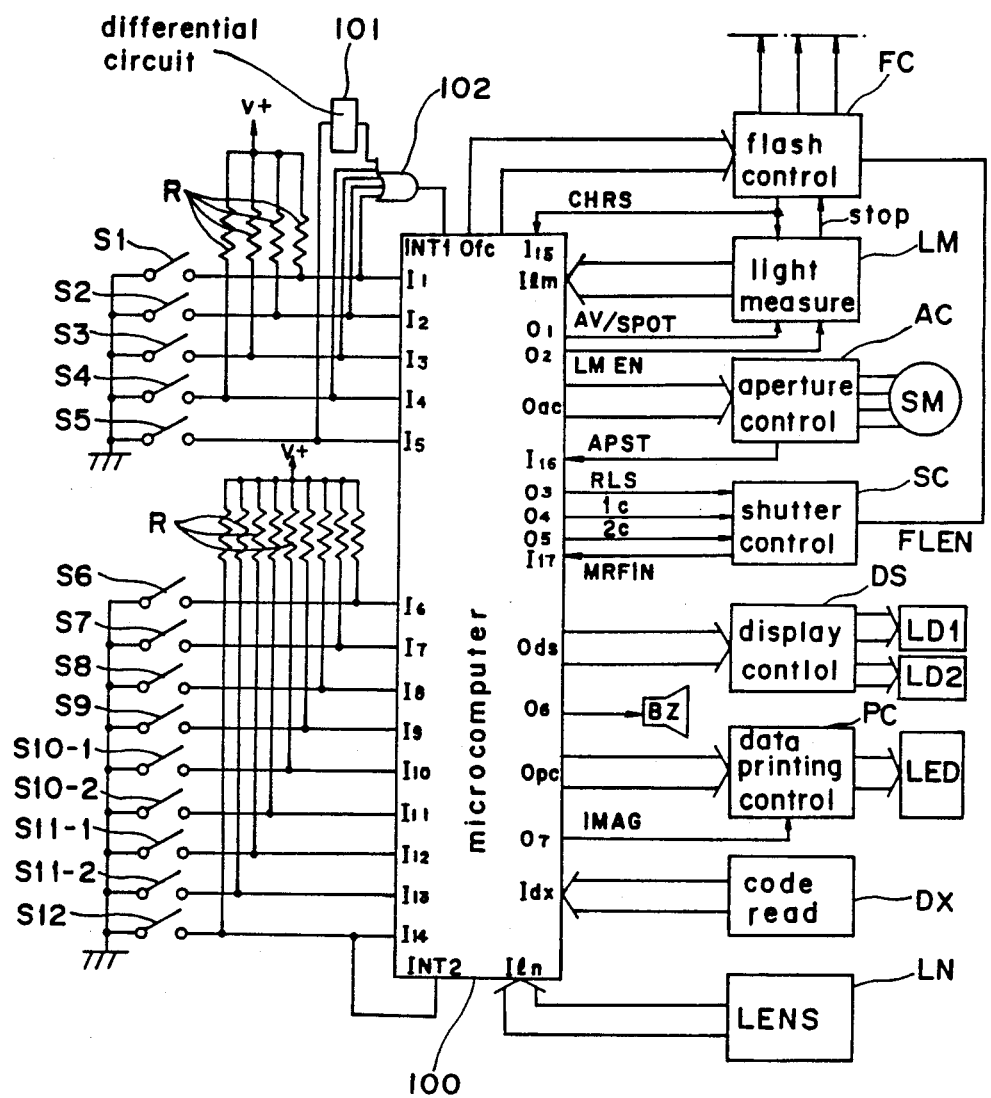
FIG. 10 is a block diagram of a circuit arrangement of the camera system according to the present invention.
Figure 11:
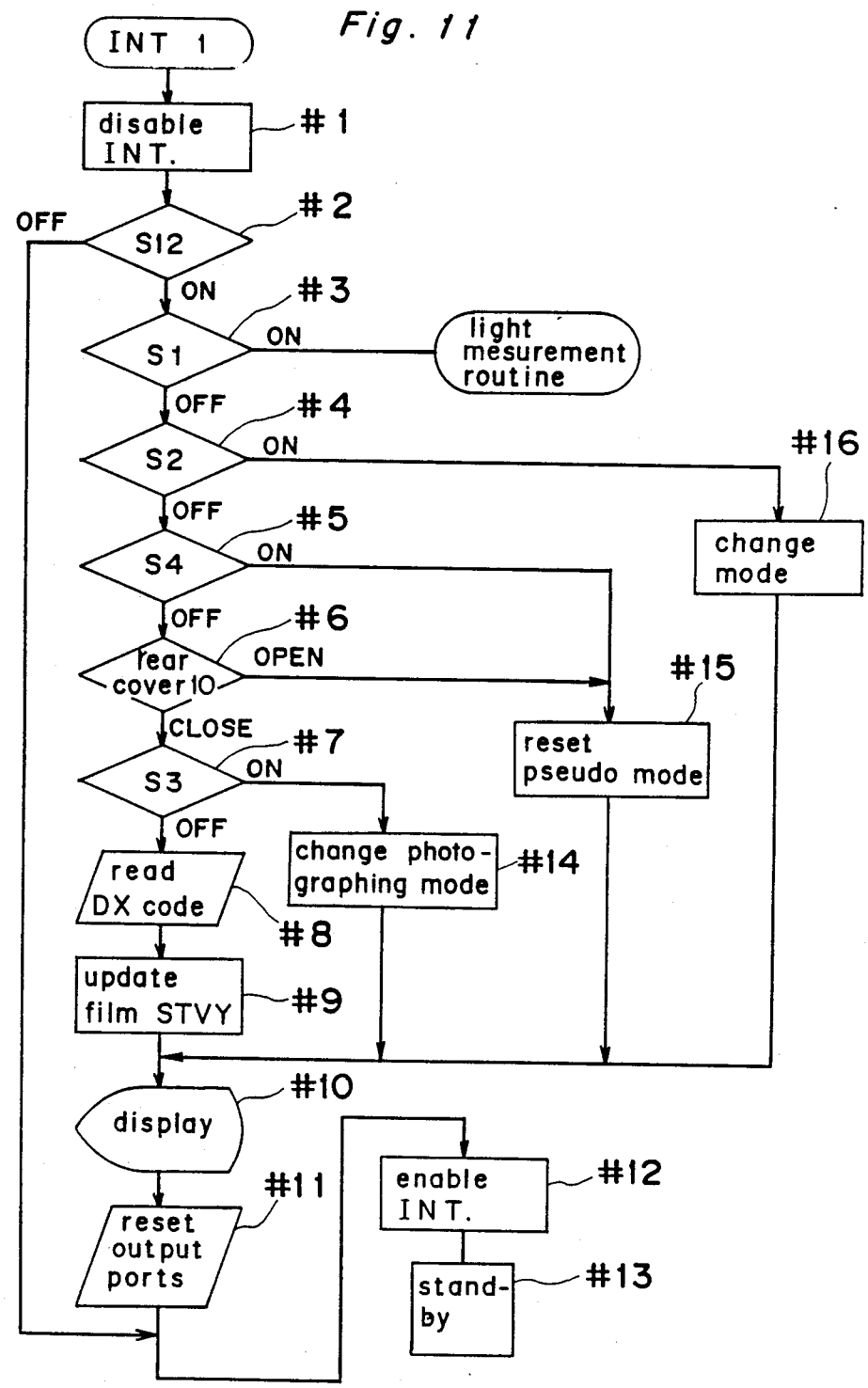
FIGS. 11 to 16 are respective flow charts showing the operation of the camera system according to the present invention.

Referring to FIG. 10 showing the control device of the camera according to the embodiment, a central processing unit (referred to as CPU) 100 made of a microcomputer receives signals from the various switches at its input ports I1 to I14 and control signals can be outputted from its output ports 01 to 07. S1 is the switch which is turned on by the operation of the shutter release button 3 to the first depth, S2 is the switch which is turned on by the operation of the mode selecting button 11. S3 is a switch which is coupled to the pseudo photographing mode set button 1, S4 is a switch which is turned on at the time of mounting and removing of the lens to the camera in response to the operation by the lens lock button 12. S5 is a switch which is turned on at the time of opening of the rear cover 19, S6 is a switch which is turned on when the shutter release button 3 is moved to the second depth.

S7 is a switch which is turned on by the operation of the preview button 4, S8 is a switch which is operated by the light measurement mode switch 9, S9 is a switch which is turned on by the release operation of the shutter due to the operation of the release button 3 and is turned off upon completion of the film winding operation. Switches S10-1 and S10-2 are respectively operated by the shutter speed setting switch 6 and S10-1 is turned on when the shutter speed is set to a high speed and S10-2 is turned on when the shutter speed is set to a lower speed. Switches S11-1 and S11-2 are respectively operated by the aperture setting switch 10 and the switch S11-1 is turned on when the aperture is set to the opening side and the switch S11-2 is turned on when the aperture is set to the closing side. S12 is a switch operated by the main switch 2. The respective switches S1 to S12 have their one end grounded and another end connected to the input ports I1 to I14 which pulled up at High (referred to as "H" hereinafter) through a resistor R and pulled down to Low (referred to as "L" hereinafter) when corresponding switch is turned on.

The switches S1 to S4 are connected to an AND gate 102 directly and S5 is connected to the AND gate 102 through a differential circuit 101. The output of the AND gate 102 is connected to the interrupt terminal INT1 of CPU 100. The interrupt terminal INT2 is connected with the input port I14. When the state of the interrupt terminal INT1 is changed to "L" from "H", the interrupt in the CPU 100 is enabled. When any one of the switches S1 to S4 is turned on or when the ouput of the differential circuit 101 is turned to "L" due to on or off of the switch S5, an interrupt signal is fed to the interrupt terminal INT1 of the CPU 100 from the AND gate 102, whereby the interrupt in the CPU 100 is enabled.

When the interrupt terminal INT2 is changed to "H" from "L", the interruption in CPU 100 is enabled.

FC denotes a flash control circuit which is connected to a flash device through the connecting pins 8. The flash control circuit FC receives various information including the equivalent focal length for changing the light distribution characteristic by the flash light, pseudo focal length photographing mode, aperture value and film sensitivity, through the terminal Ofc of CPU 100. A charge completion signal CHRS which respresents completion of the charge in the main capacitor in the flash control circuit FC is fed to the input port I15 of CPU 100 and the light measuring circuit LM. The light measuring circuit LM measures the brightness Bv of an object to be photographed using any one of the average light measurement or spot light measurement depending on the instructions fed from the output port 01 and light measurement enabling signal LMEN from the output port 02 and the result of the measurement obtained in the light measurement circuit LM is fed to the input port I lm of CPU 100. The light measurement circuit LM also provide a signal to stop the light emission to the flash control circuit FC.

An aperture control circuit AC for controlling the diameter of the aperture diaphragm of the camera is adapted to drive the stepping motor SM which opens or closes the diaphragm aperture in response to the signal from the output port Oac of CPU 100. When the movement of the aperture diaphragm driven by the motor SM is finished, a signal showing APST showing that the motor SM is stopped is applied to the input port I16 or CPU 100 from the aperture control circuit AC.

A mirror and shutter control circuit SC for controlling the motion of a first curtain and a second curtain of the focal plane shutter receives the signals RLS for releasing the shutter and 1C and 2C for controlling the movement of the first and second curtains from the output ports 03, 04 and 05. Also the mirror and shutter control circuit SC provides a signal MRFIN representing that the mirror 15 is fully rotated to the uppermost position to the input port I17 of CPU 100 and a signal FLEN for instructing light emission to the flash control circuit FC.

A display control circuit DS controls the respective display units LD1 and LD2 in response to the signal from the output port Ods.

A buzzer BZ is provided for alarming a camera shake by an audible signal in response to the signal fed from the output port 06 of CPU 100.

A data printing circuit PC receives data signals representing the photographing mode information from the output port Opc and generates the signals to cause LED1 and LED2 to emit the coded light representative the photographing mode information so that the photographing mode information can be printed or recorded on the negative. The data printing circuit PC is enabled by the signal IMAG from the output port 07.

A code reader DX is provided for reading the film sensitivity described in a film cartridge (not shown). The film sensitivity read by the code reader DX is fed to the input port Idx of CPU 100.

A lens circuit LN provided in the lens to be attached to the camera transfers the focal length data and minimum aperture value and maximum aperture value of the lens to CPU 100 through the input port I ln.

Operation of the circuit arrangement shown in FIG. 10 is explained hereinafter with reference to the flow charts shown in FIGS. 11 to 16.

As mentioned before, when any one of the switches S1 to S4 is turned on or the switch S5 is turned on or off, an interruption signal is applied to the interrupt terminal INT1. Once the interruption is enabled in CPU 100, a subsequent interruption is disabled in the step #1 for preventing trouble in the later processes. In the step #2, it is judged whether or not the main switch 2 is on. In case the main switch 2 is off, the program goes to #12 wherein the inhibit of the interruption is enabled, advancing to the step #13 in which unnecessary clocks in CPU 100 are disabled to save power consumption, whereby CPU 100 is brought into stand-by condition. In case where the main switch 2 is on, the program goes to #3 and it is judged whether or not the switch S1 is on to detect whether the shutter release button 3 is pressed to the first depth. With the switch S1 on, the program flow goes to a light measurement routine which will be explained later. With the switch S1 off, the program goes to #4 to judge whether or not the switch S2 is on for detecting whether or not the mode selecting button 11 is operated. With the switch S2 on, the program goes to #16 in which the photographing mode is changed then the program goes to #10.

In case the mode selecting button 11 is not depressed, the program goes to #5 to judge whether or not the lens locking button 12 is depressed for removing the lens from the camera or mounting the lens to the camera by sensing the state of the switch S4. In case the lens lock button 12 is being depressed, i.e., the switch S4 is off, the program goes to #6 and it is judged whether the rear cover 19 is closed or opened by sensing the state of the switch S5. In case the rear cover 19 is opened for interchanging the photographic film, the program goes to #15 wherein the pseudo focal length photographing mode is reset, then the program goes to #10. On the other hand, when the rear cover plate 19 is kept closed, the program goes to #7, wherein the state of the psuedo photographing mode set button 1 i.e., the switch S3 is judged. In case the pseudo photographing mode set button 1 is depressed, the program goes to #14 to change the pseudo photographing mode, thereafter the program goes to #10. As mentioned already, the pseudo photographing mode can be changed in response to every one push of the pseudo photographing mode set button 1.

In case the pseudo photographing mode set button is not depressed, the program goes to #8 to read the film sensitivity by the code reader DX, then the film sensitivity (referred to as STVY in FIG. 11) is updated in the step #9 according to the sensitivity thus read in the step #8. The film sensitivity thus set is displayed in the display unit LD1 in the step S10. Thereafter, the output ports of CPU 100 is reset in the step #11, then the interruption is enabled in the step #12. CPU 100 is brought into the stand by condition in the step #13.

Figure 12:
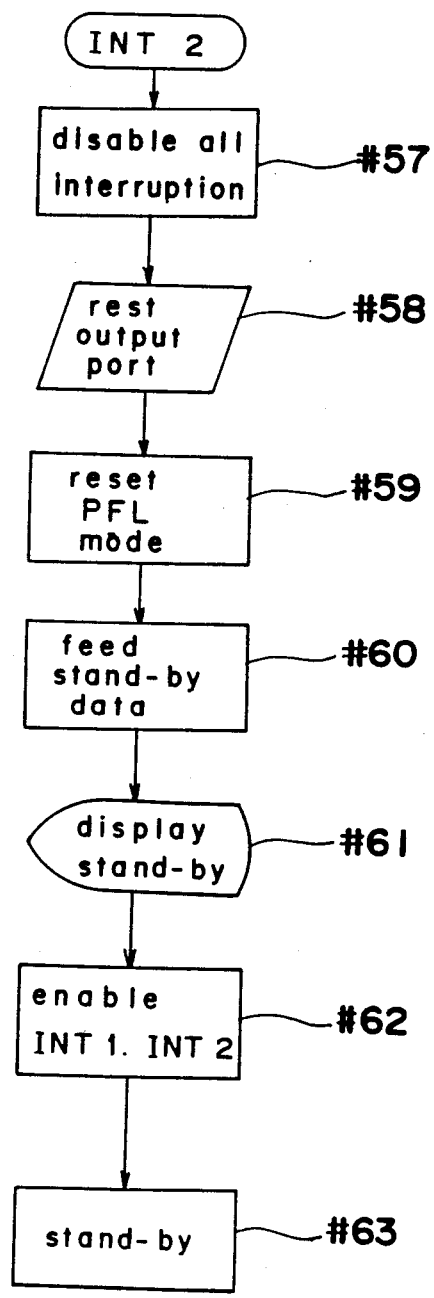

Referring to FIG 12, showing the process of the interruption at the interrupt terminal INT2, the terminal INT2 is turned from "L" to "H" at the time of change of the state of the main switch 2 from on to off then the interrupt occurs. Upon this interruption, all other interruption is disabled to prevent the INT2 routine from being intercepted by the other interruption signal. All of the output ports are reset in the step #58. The photographing mode is reset in the step #59 to return to the real focal length photographing mode. By this operation, the photographing mode is automatically returned to the normal real focal length photographing mode whenever it becomes necessary to set the normal mode, for examples, when the main switch 2 is turned off, the lens lock button 12 is depressed so as to mount or remove the lens to or from the camera or the rear cover 19 is opened and closed. This operation enables to prevent erroneous photographing due to failure in resetting the pseudo focal length photographing mode.

In the step #60 the data representing the stand-by state is fed to the display control circuit DS, so that the stand-by state is displayed in the display unit DS1 in the step #61. In the step #62, the interruption at the terminals INT1 and INT2 is enabled and the stand-by state is started in the step #63. In case the main switch 2 is off, the camera can not be operated.

Figure 13A:
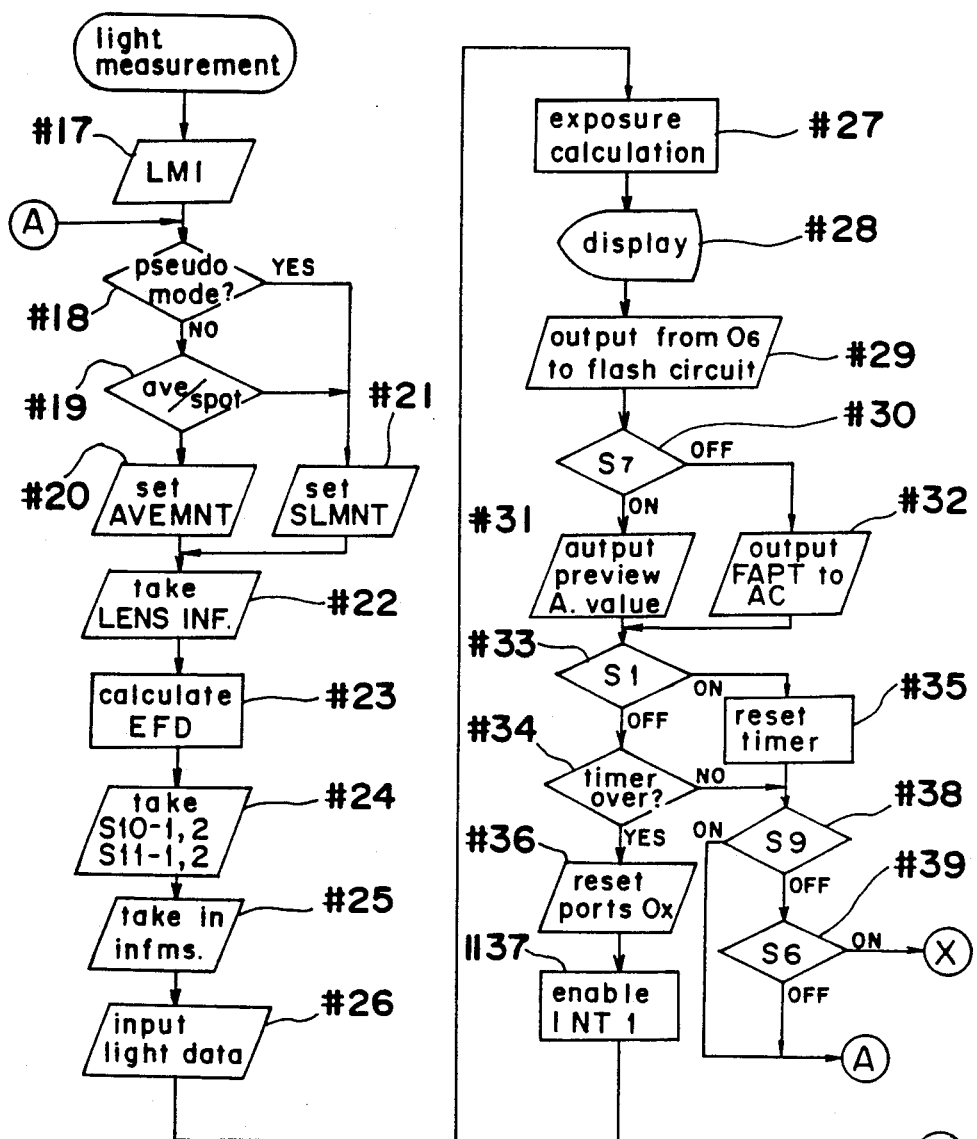
Figure 13B:
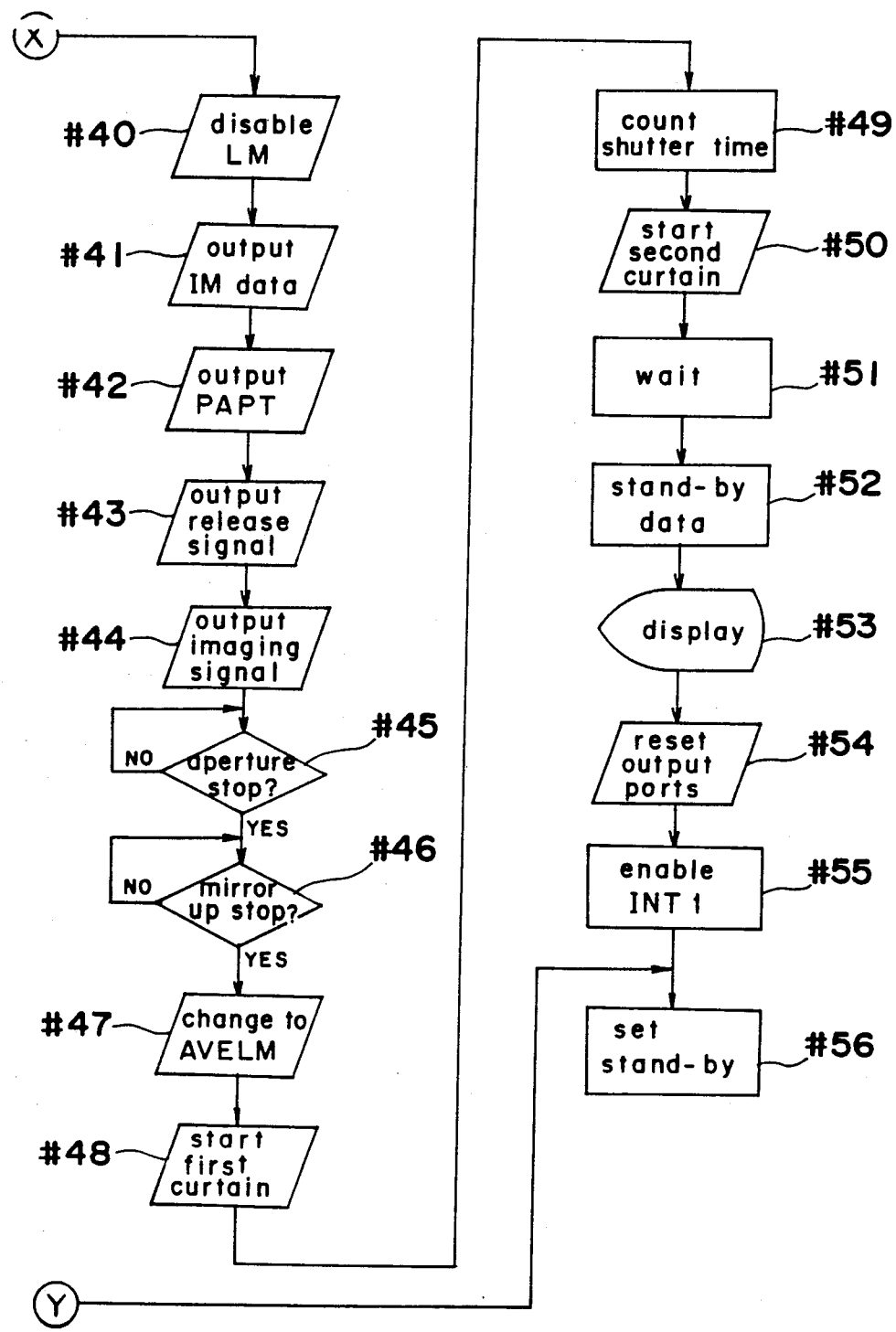

FIG. 13(a) and 13(b) show the light measurement routine which is caused by the operation of the shutter release button 3 to the first depth in the step #3.

The light measurement can be initiated (LMI) upon application of the signal LMEN (a signal for initiating a light measurement) to the light measurement circuit LM from the output port 02 in the step #17. It is judged in the step #18 whether or not the pseudo photographing mode set button 1 is operated that is whether or not the pseudo focal length photographing mode is set. In case the pseudo focal length photographing mode is set, the program goes to #21 and the spot light measurement is set in CPU 100, then goes to the step #22.

As mentioned above, in case of pseudo focal length photographing mode, the spot light measurement is automatically selected independent of the state of the light measurement switch 9 so as to prevent the light measurement of the portion out of the printed range of the pseudo focal length photographing mode. In case the pseduo focal length photographing mode is not set, it is judged in the step #19 which of the average light measurement or spot light measurement is set by detecting the state of the light measurement mode switch 9.

In case the spot light measurement is selected by the switch 9, the spot light measurement (SLMNT) mode is set in the step #21, while the average light measurement (AVEMNT) is set in the step #20 in case the AVEMNT is selected by the switch 9. In the next step #22, the lens information (LENS. INF.) including the focal length, maximum aperture value and minimum aperture value is taken in CPU 100 from the lens circuit LN.

The equivalent focal length (EFL) is calculated in the step #23 using the actual focal length of the lens and the printed range. In the step #24, the shutter speed Tv and aperture value Av are taken in CPU 100 based on the signals of the switches S10-1, S10-2, S11-1 and S11-2. In the step #25, the photographing mode, the exposure control mode, state of mounting of the lens LN to the camera and opening or closing state of the rear cover are taken in CPU 100 corresponding to the state of the switch S2 to S5. This operation is expressed as taken in infms in FIG. 13(a). When the light measurement data obtained in the light measurement circuit LM are applied to the input port I lm in the step #26, the shutter speed Tv, aperture value Av and the equivalent aperture value are calculated at the step #27 according to the exposure calculation routine explained later. In the step S28, The results of the calculation mentioned above are displayed in the display unit LD1.

By displaying the equivalent aperture value and equivalent focal length in the display unit LD1, it becomes possible to know the depth of field and the telephoto effect under the pseudo focal length photographing mode.

In the step #29, the information used for the flash photography such as the equivalent focal length and so on are outputted from the output port Ofc to the flash control circuit FC in order to change the light distribution characteristic. By the operation mentioned above, the lens disposed in front of the flash tube can be moved by a motor (not shown) and the light emitting angle can be changed. In the step #30, the state of the switch S7 is judged for detecting the operation of the preview button 4. In case the preview button 4 is depressed and the switch S7 is on, the preview aperture value which is calculated on the basis of the light measurement value in the calculation routine is outputted from the output port Oac to the aperture control circuit AC in the step #31. Then a stepping motor is driven to control the aperture size to a set aperture size. In case the preview button is not operated, the opened aperture value is fed to the lens circuit LN, and the aperture of the lens is fully opened. In the step #33, the state of the light measurement switch S1 (which is turned on when the shutter release button 3 is depressed to the first depth) is judge. In case the switch S1 is on, the program goes to #35 in which a timer for holding the power supply is reset, then the program goes to #38.

By the operation mentioned above, when the switch S1 is on, the power supply to the camera is continued by the reset of the timer, to the contrary, when the switch is off, it is judged in the step #34 whether or not the timer counts up the time for keeping the power supply. If the time set in the timer is over, all of the output ports Ox (x=1 to 7, fc, ac, ds, pc) are reset in the step #36 and the INT1 interruption is enabled in the step #37, then the program goes to #56 to set the stand-by condition. If the time set in the timer is not over, the program goes to #38 to judge whether or not the switch S9 is on in order to detect that the shutter is released by the operation of the shutter button 3 and the film winding of one flame is finished. If the film winding has not yet been completed, the step returns to #18 to prevent the shutter release.

In case, the film winding is completed, the program goes to #39 to judge the switch S6 to detect that the release button 3 is depressed to the second depth. In case the button 3 is not depressed, the step returns to #18 to repeat the above mentioned operation. In case the shutter release button is depressed to the second depth, the program goes to #40 in which the light measurement by the light measurement circuit LM is disabled and reset the camera shake warning signal to prepare the next shutter release. In the step #41, the printing information (referred to as IM in FIG. 13(b)) of the photographing data including the photographing mode and equivalent focal length to be recorded in the photographing film is applied to the data printing circuit PC. The photographing aperture value (referred to as PAPT in FIG. 13(b) is outputted to the aperture control circuit AC in the step #42, whereby the aperture diaphragm of the photographing can be stopped down to the corresponding size.

In the step #43, the release signal is outputted from the output port 03 to the mirror and shutter control circuit SC, whereby the mirror 15 is rotated upward. The printing signal is outputted from the output port 07 to the data printing circuit PC in the step #44 and the printing information is recorded in the photographing film.

In the steps #45 and #46, it is judged whether or not the aperture is stopped down to the predetermined size and the mirror is fully lifted, and in case both of the operations are completed, the program goes to #47. In the step #47, the light measurement mode is changed to the average light measurement mode (AVELM) for performing the flash light control. When a signal 1c is outputted from the output port 04 to the mirror and shutter control circuit SC, the first shutter curtain is started to start exposure in the step #48 and to start a timer in CPU 100 to count the lapse of the exposure time in the step #49. When the exposure time is over, a signal 2c is outputted from the output port 05 to the mirror and shutter control circuit SC in the step #50, whereby the second shutter curtain is started to finish the exposure.

When the first shutter curtain is completely opened, a flash light emitting signal is fed to the flash control circuit FC from the mirror and shutter control circuit SC, then the flash light is emitted to a photographic object. The flash light reflected from the photographic object is received by the camera and integrated in the light measurement circuit LM. When the integrated value becomes a predetermined value, a flash light stop signal is fed to the flash control circuit FC and the flash light is turned off. When the second shutter curtain reaches its terminal position and after waiting for a time set in the step #51, the program goes to #52 in which the information of the shutter speed and aperture value displayed in the display unit LD1 is turned off and produce the stand-by instruction, which is displayed in the display unit LD1 in the step #53. Then the output ports Ox are reset in the step #54 and in turn the INT1 interruption is enabled in the step #55 and the stand-by mode is set in the step #56.

Figure 17A:
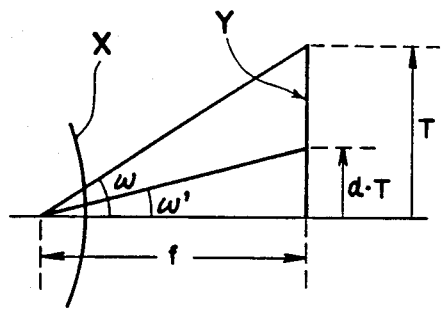
FIGS. 17(a) and 17(b) are respective schematic diagrams used for explanation of the equivalent focus.

A way of calculation of the equivalent focal length is explained hereinafter with reference to FIGS. 17(a) and 17(b). In FIG. 17(a), X represents the photographic lens, f represents the focal length of the lens, T denotes a height of the image formed on the photographic film Y under the normal (real focal length) photographing mode. It is assumed that the height of the image is changed to $\alpha T$ by the pseudo focal length photographing mode.

There are following relations.

$$\tan \omega = T/f, \tan \omega' = \alpha T/f$$

Figure 17B:
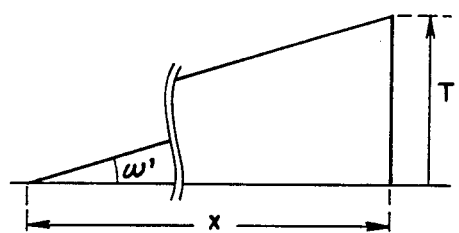

FIG. 17(b) shows the feature of a pseudo focal length photographing mode in which the height $\alpha T$ of the image on a negative is enlarged to T and x represents the equivalent focal length. In this case, $\tan \omega = T/x$, then $$x = T/\tan \omega' = T/(\alpha T/f) = f/\alpha \qquad (1).$$

Therefore, if the pseudo focal length photographing mode is set so that the image height αT in the mode is a half image height T in the normal mode, the equivalent focal length is 70 mm when the photographing lens having an actual focal length of 35 mm is used for photographing. In such case α is ½, and a quarter size of the normal printing area in the negative is printed on the photographic paper. If a half size thereof is set to be printed in the pseudo focal length photographing mode, α becomes $1/\sqrt{2}$.

Figure 14:
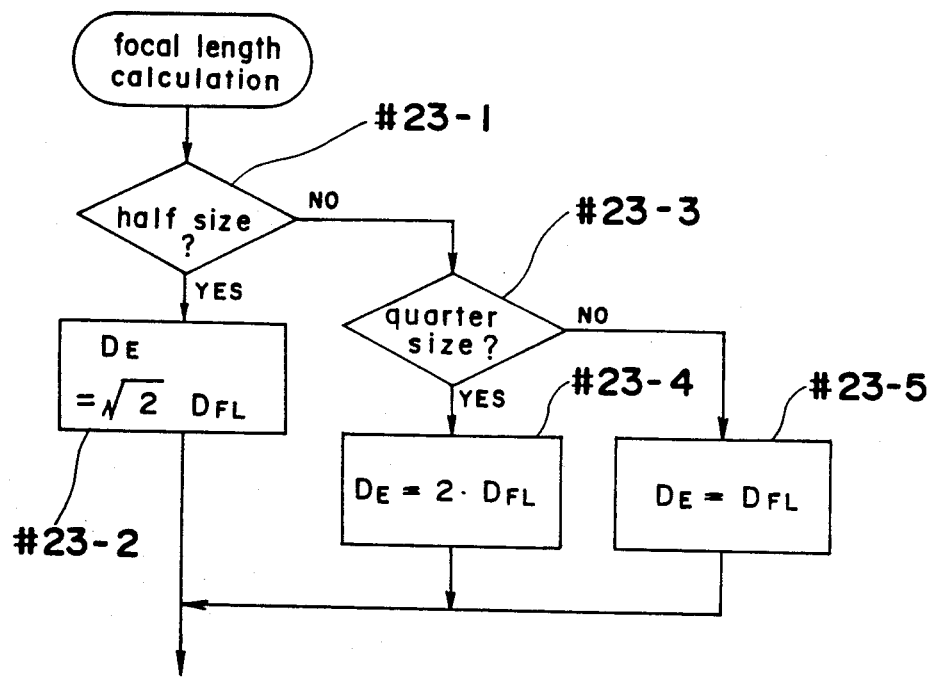

As shown in FIG. 14 for the equivalent focal length calculation routine, in case of a half size pseudo focal length photographing mode, $\sqrt{2}\times$(focal length of the photographic lens $D_{FL}$)=the equivalent focal length $D_E$ is calculated in the step #23-2. In case of quarter size pseudo focal length photographing mode, $2\times$(focal length of the photographic lens)=the equivalent focal length is calculated in the step #23-4.

Figure 15A:
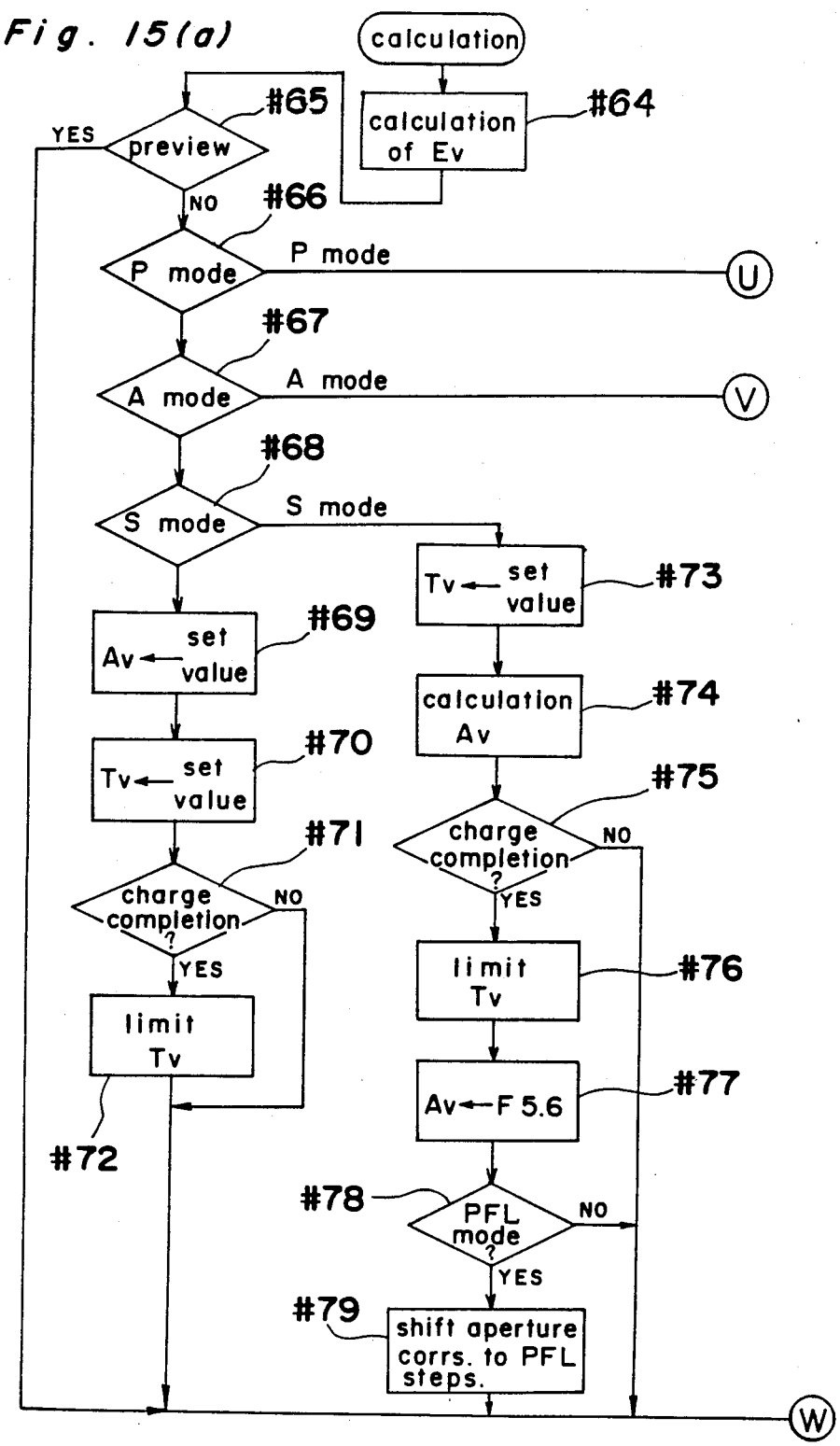
Figure 15B:
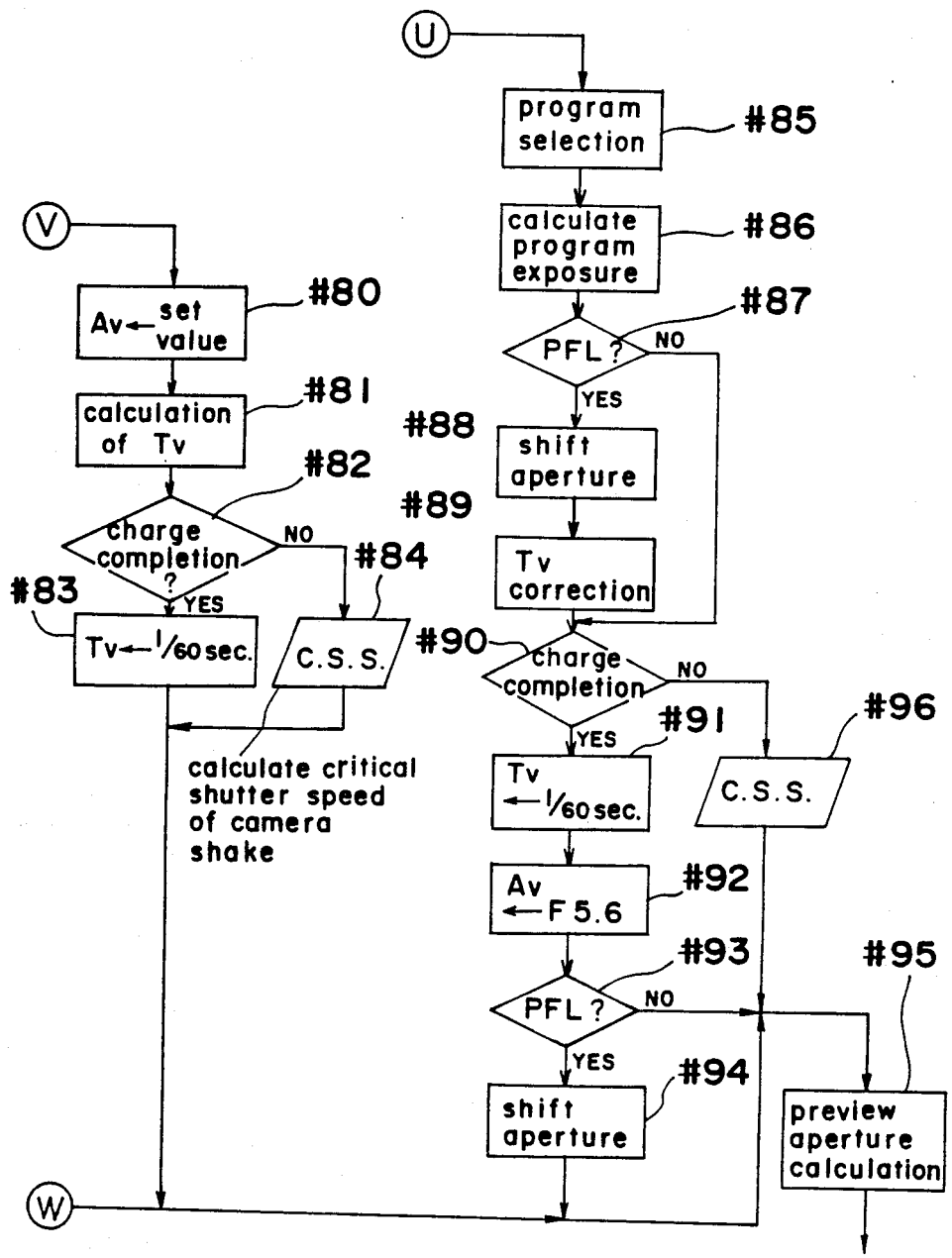

FIG. 15 shows the routine for the calculation of the exposure value.

In the step #64, the exposure value Ev is calculated by the equation.

$$(Ev=Bv+Sv)$$

on the basis of the film sensitivity Sv obtained from the code reader DX and the brightness Bv of the object from the light measurement circuit LM. In the step #65, the state of the preview button 4 is judged. In case the preview mode is set, only the equivalent aperture value and preview aperture value are calculated in the step #95 for such a case that the equivalent aperture value or preview aperture value are changed during photographing. In case the preview mode is not set, the exposure control modes are detected in the steps #66, #67 and #68.

In case of the manual mode (M mode), the aperture value Av manually set is taken in in the step #69 and the shutter speed Tv manually set is taken in in the step #70. In case of the flash photography mode and when the charge in the charge completion is detected in the step #71, the shutter speed Tv is limited in the range that the shutter speed Tv can synchronize with the light emission of the flash device, then the program goes to #95.

In case of the shutter speed priority mode (S mode), the program goes to #73 from #68, whereby the shutter speed Tv manually set is taken in in the step #73, then the aperture value Av is calculated on the basis of the shutter speed Tv and the exposure value Ev in the step #74. Then in the step #75, in case the flash photographing is not set, the program goes to #95. In case of the flash photographing mode with the charge completion, the shutter speed Tv is limited so as to be synchronized with the flash light emission in the step #76. Then in the step #77, the aperture value Av is set to F5.6 in the step #77, then it is judged in the step #78 whether or not the pseudo focal length photographing mode is set. In case of the pseudo focal length photographing mode, the aperture size is shifted to the open side corresponding to the set pseudo focal length photographing mode. In case the pseudo focal length photographing mode is not set, the program goes to #79.

In case the A mode (aperture value priority mode) is set, the program goes from #67 to #80 wherein the aperture value Av which is manually set is taken in. In the subsequent step #81, the shutter speed Tv is calculated on the basis of Ev and Av. Then the charge completion is detected in the step #82, if the flash photography mode is set. If the flash photography mode is set and the charge of the main capacitor is completed, the shutter speed is set to 1/60 sec. in the set #83, then the program goes to #95. In case the flash photography mode is not set, the critical shutter speed for the warning by the buzzer at which the camera shake may occur is calculated according to the table 1 using the equivalent focal length in the step #84.

TABLE 1

| equivalent focal length | critical shutter speed |
|---|---|
| less than 35 mm | 1/30 sec. |
| 35 mm to 105 mm | 1/60 sec. |
| more than 105 mm | 1/100 sec. |

The critical shutter speed for warning the camera shake is calculated corresponding to the equivalent focal length because it is non sense to decide the critical shutter speed in accordance with only the actual focal length of the lens in such a camera that is adapted to obtain the print having the same photographic effect under the pseudo focal length photographing mode as the print made by the photographing with the photographing lens having longer focal length.

In case of the P mode (program mode), the program goes from #66 to #85 wherein the photographing program is selected to decide the relation between the shutter speed Tv and aperture value Av corresponding to the equivalent focal length. The selectable photographing programs are shown in FIG. 18.

Figure 18:
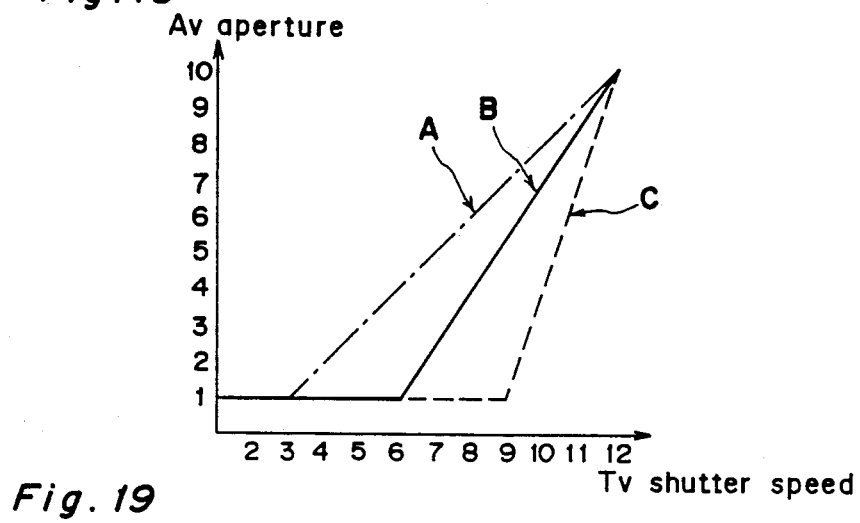
FIGS. 18 and 19 are respective schematic diagrams of a program used in the camera shown in FIG. 1.

In FIG. 18, lines A, B and C represent the photographing program lines under the equivalent focal length less than 35 mm, 35 to 105 mm and more than 105 mm. The exposure value Ev and shutter speed Tv are calculated in the step #86 according to the selected program line. By the calculation, the higher shutter speed can be determined as the equivalent focal length is longer, so that the camera shake can be prevented.

In the step #87, it is judged whether the pseudo focal length photographing mode is set. If the pseudo focal length photographing mode is not set, the program goes to #90. If the pseudo focal length photographing mode is set, the program goes to #88 in which the aperture value thus calculated according to the program line is modified to shift the aperture value to the aperture open side by a predetermined value as shown in the table 2 so that the depth of field under the pseudo focal length photographing mode can be nearly equal to the depth of field under the normal photographing mode.

TABLE 2

| printed size | shift value to the open side |
|---|---|
| half size | 1 step |
| quarter size | 2 steps |

Figure 19:
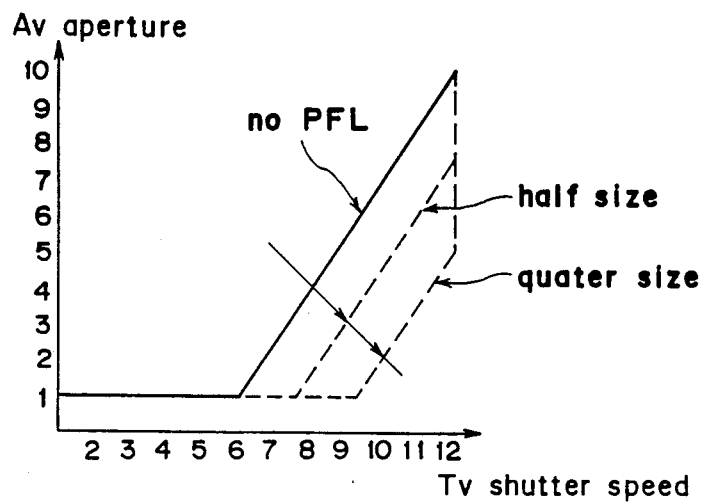

FIG. 19 shows the relation between the shift value of the aperture diaphragm and the printed size. According to the diagram shown in FIG. 19, the shutter speed is also controlled corresponding to the aperture shaft value so as to keep the exposure value in the step #69. In case the flash photography mode is not set, the critical shutter speed for preventing the camera shake is controlled in the step #96 according to the table 1 as explained with reference to the A mode, then the program goes to #95. In case the flash photography mode is set, upon detection of the charge completion in the step #90, the program goes to #91 and #92 to set the shutter speed Tv to 1/60 sec. and the aperture value Av to F 5.6. Then the program goes to #93 wherein it is judged whether or not the pseudo focal length photographing mode is set. In case the pseudo photographing focal length mode is not set, the program goes to #95. In case the pseudo photographing mode is set, the aperture value is shifted toward the open side corresponding to the printed size, then goes to the step #95.

In the step #95, the equivalent aperture value and preview aperture value is calculated.

The following explanation is made with reference to the lens having a focal length same as the equivalent focal length.

In general, the depth of field is given by $$a = u^2 \cdot \delta \cdot F/f^2 \qquad (2)$$

wherein f represents the focal length of the photographing lens and F aperture value thereof.

Assuming that the actual focal length is $f/\alpha$, aperture value is F, the depth of field a1 is expressed $$a1 = \alpha^2 \cdot u^2 \cdot \delta \cdot F/f^2 \qquad (3)$$

When pseudo focal length photographing mode with the equivalent focal length $f/\alpha$, the depth of field a' is expressed as $$\begin{aligned} a' &= u^2 \cdot \alpha \delta \cdot F/f^2 \\ &= \alpha \cdot u^2 \cdot F/f^2 \end{aligned} \qquad (4)$$

The actual depth of field can be known by closing the aperture to such a value as expressed by Fpv satisfying the following equation $$\begin{aligned} a' &= \alpha \cdot u^2 \cdot \delta \cdot F/f^2 \\ &= u^2 \cdot \delta \cdot F_{pv}/f^2 \end{aligned}$$

using F' as the aperture value at the time of pseudo focal length photographing mode.

From the foregoing, $F_{pv} = \alpha F$ can be obtained.

By the equations (3) and (4), in case the same aperture value is used for the pseudo focal length photographing mode and the normal photographing mode using the lens with the equivalent focal length, the following relation can be obtained.

$$\text{by } F = F', \ a1 = a'(\alpha < 1) \qquad (6)$$

From the foregoing, it can be understood that the depth of field of the pseudo focal length photographing mode is deeper than that in the normal photographing mode.

The equivalent aperture value F with reference to the depth of field is the aperture satisfying a1=a', then $$F' = \alpha F, \text{ whereby } F = F'/\alpha \qquad (7).$$

To the contrary, in order to obtain a desired depth of field using the lens having $f/\alpha$ corresponding to the equivalent focal length with the shallow depth of field at the time of the pseudo focal length photographing mode, the depth X can be expressed $$X = \alpha^2 \cdot u^2 \cdot \delta \cdot F/f^2.$$

The depth of field Y of the pseudo focal length photographing mode with the aperture opened from F to F' is expressed from the equation (4)

$$Y = \alpha \cdot u^2 \cdot \delta \cdot F'/f^2$$

From the equation $X = Y$, $F' = \alpha F$ (10) can be obtained. Therefore, the aperture should be controlled to satisfying the equation (10) can be obtained.

Figure 16:
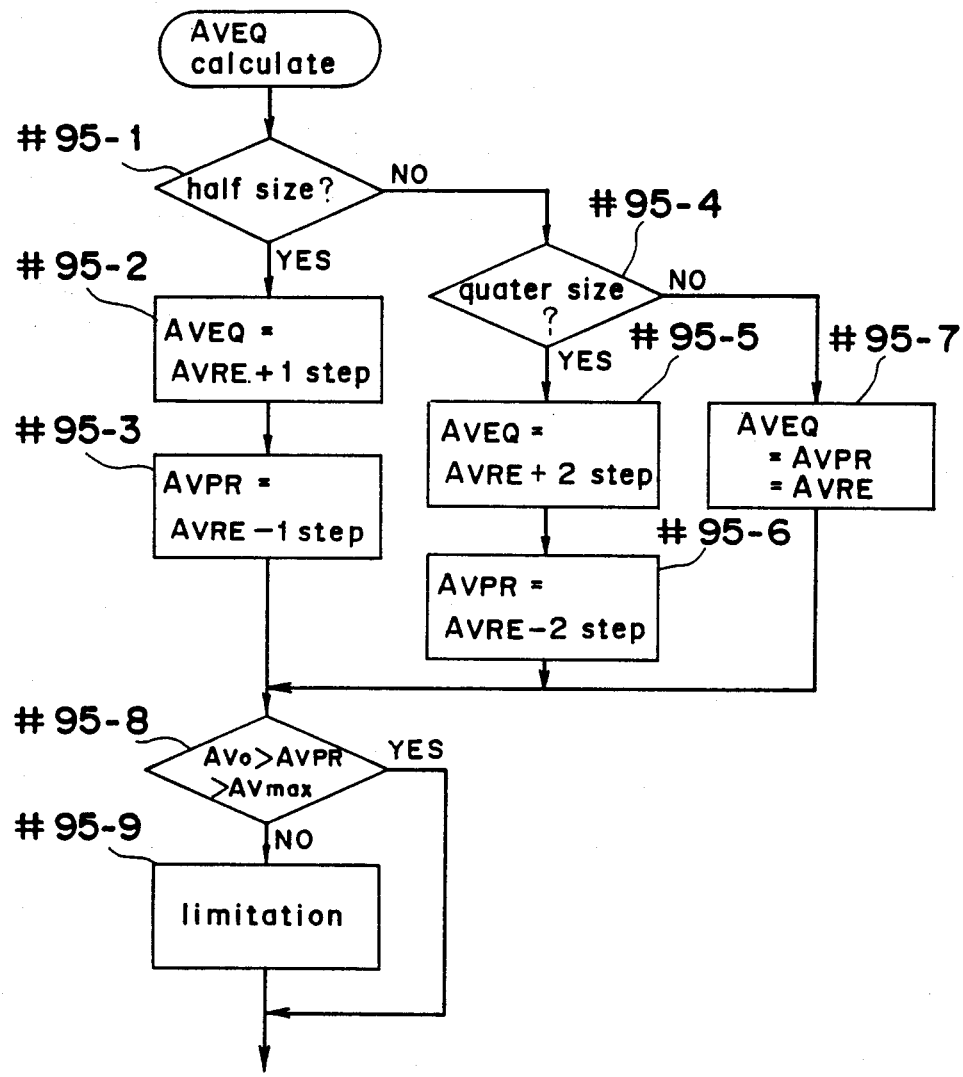

As mentioned above, since the depth of field is made deep in the pseudo focal length photographing mode, the calculation of the aperture value is performed by the program shown in FIG. 16. In the steps #95-1 and 95-2, it is judged whether the half size pseudo focal length photographing mode or quarter size pseudo focal length photographing mode is set. With the half size mode, the equivalent aperture value $Av_{EQ}$ is obtained by closing the aperture size by one step from the actual aperture value $Av_{RE}$ as calculated in the step #95-2. In the step #95-3, the preview aperture value $Av_{PR}$ is calculated by closing the aperture size by 1 step from the actual aperture value $Av_{RE}$ for the half size mode. With the quarter size mode, the equivalent aperture value $Av_{EQ}$ is obtained in the step #95-5 by opening the aperture size by 2 steps from the actual aperture value $Av_{RE}$. In the step #95-6, the preview aperture value $Av_{PR}$ is obtained by opening by 2 steps of the aperture size from the actual aperture value $Av_{RE}$.

This operation is made because the depth of field becomes shallow in the pseudo focal length photographing mode compared to the normal photographing mode for the same aperture value. Therefore, the aperture value in the preview mode is changed to obtain the print having the same depth of field.

As mentioned above, according to the embodiment, in the pseudo focal length photographing mode, the spot light mesurement is automatically selected without manual operation, so that even if there is an undesired bright object outside the printed range in the mode, a correct light measurement for the desired object can be made by the spot light measurement, thereby being possible to make a good pseudo print without the interference of said unduly bright object.

Although the preferred embodiment of the present invention is described, the present invention is not limited to the above mentioned embodiment. For example, in the embodiment mentioned above, the spot light measurement is automatically selected when the pseudo focal length photographing mode is set despite the light measurement switch is selected to the average light measurement, however, the light measurement mode switch may be arranged in such a manner that when the pseudo focal length photographing mode is selected, the light measurement mode switch is not brought into the spot light measurement mode. Also, the light measurement switch may be formed by a push button so that light measurement of the field out of the object field is automatically inhibited. Moreover, in case a multi point light measurement mode or the other light measurement modes are contained in addition to the average light measurement mode and spot light measurement mode, they may be inhibited in the pseudo focal length photographing mode.

In the embodiment mentioned above, although the aperture value at the preview mode is opened stepwise corresponding to the printed size, in case the printed size is changed continuously, the aperture value at the preview mode may be changed continuously. The control of the aperture value may be performed other than the electric motor.

Moreover, in place of detecting the state of the lens lock button 12 for mounting and removing the lens as mentioned above, it may be employed to detect such a state that the lens is removed. Such state may be detected by a switch or by such a judgment that a signal from the lens is correct.

Moreover, for detecting the rear cover 19, it may be possible to detect that the rear cover is closed from the opened state. Also, in case of the camera having an automatic film winding device, the pseudo focal length photographing mode may be released when the photographing film in the camera is completely used or the rewinding of the film is performed.

In the embodiment mention above, since the pseudo focal length photographing mode is cancelled and the mode is returned to the normal photographing mode when it is apparent that normal photographing mode is necessary when the main switch is turned off or the rear cover is opened and closed for interchange of a photographing film, operation for releasing the pseudo focal length photographing mode is unnecessary. Therefore, operation of the pseudo photographing mode set button 1 is unnecessary and it becomes possible to prevent undesired photographing due to failure in releasing the pseudo focal length photographing mode.

In the embodiment mentioned above, the equivalent focal length can be automatically calculated corresponding to the degree of the printed size and the critical shutter speed for warning the camera shake can be changed corresponding to the equivalent focal length. Specifically, when the equivalent focal length is large, the critical shutter speed for waring the camera shake is changed to the higher speed, the effect of the camera shake may be prevented. Moreover, by transferring the information of the equivalent focal length to the flash device, the light distribution of the flash device can be changed. By these arrangement, the various necessary photographing control modes can be automatically performed by the same control device against the change of the equivalent focal length.

The equivalent focal length may be calculated by adding the logarithmically compressed numerical value in order to cover a wide range of the focal length.

The equivalent focal length may be used to change the accuracy of the focal length detection, change the focal length range, change the accuracy of the lens drive, to print the equivalent focal length in the negative as the photographing data. The equivalent focal length may be stored in a separate memory for the record of the photographing data.

Also the present invention may be applied not only to the camera for the interchangeable lens but also to camera for the fixed lens.

What is claimed is:

1. A photographic camera comprising:
means for selecting between a real focal length photographing mode and a pseudo focal length photographing mode, a field to be printed in the pseudo focal length photographing mode being narrower than that in the real focal length photographing mode;
means for producing a signal corresponding to an interchange of a photographing lens; and
means for making the selecting means select the real focal length photographing mode in response to the signal.

2. A photographic camera comprising;
means for selecting between a real focal length photographing mode and pseudo focal length photographing mode, a field to be printed in the pseudo focal length photographing mode being narrower than that in the real focal length photographing mode;
means for producing a signal corresponding to an operation of a back lid of the camera; and
means for making the selecting means select the real focal length photographing mode in response to the signal.

3. A photographic camera comprising:
means for selecting between a real focal length photographing mode and a pseudo focal length photographing mode, a field to be printed in the pseudo focal length photographing mode being narrower than that in the real focal length photographing mode;
means for producing a signal corresponding to an interchange of a film; and
means for making the selecting means unconditionally select the real focal length photographing mode in response to the signal.

4. A photographic camera, having an electric circuit, comprising:
means for selecting between a real focal length photographing mode and a pseudo focal length photographing mode, a field to be printed in the pseudo focal length photographing mode being narrower than that in the real focal length photographing mode;
a main switch for switching between a first condition for enabling said camera to operate and a second condition for disabling said camera from operating; and
means for making the selecting means unconditionally select the real focal length photographing mode in response to an operation of the main switch.

5. A photographic camera comprising:
means for selecting between a real focal length photographing mode and a pseudo focal length photographing mode, a field to be printed in the pseudo focal length photographing mode being narrower than that in the real focal length photographing mode;
means for producing a signal corresponding to an interchange of a photographing lens; and
means for making the selecting means select a predetermined one of the photographing modes in response to the signal.

6. A photographic camera comprising:
means for selecting between a real focal length photographing mode and a pseudo focal length photographing mode, a field to be printed in the pseudo focal length photographing mode being narrower than that in the real focal length photographing mode;
means for producing a signal corresponding to an operation of a back lid of the camera; and
means for making said selecting means select a predetermined one of the photographing modes in response to the signal.

7. A photographic camera comprising:
means for selecting between a real focal length photographing mode and a pseudo focal length photographing mode, a field to be printed in the pseudo focal length photographing mode being narrower than that in the real focal length photographing mode;

means for producing a signal corresponding to an interchange a film; and means for making the selecting means select a predetermined one of the photographing modes in response to the signal.

8. A photographic camera, having an electric circuit, comprising;

means for selecting between a real focal length photographing mode and a pseudo focal length photographing mode, a field to be printed in the pseudo focal length photographing mode being narrower than that in the real focal length photographing mode;

a main switch for switching between a first condition for enabling said camera to operate and a second condition for disabling said camera from operating; and means for making the selecting means select a predetermined one of the photographing modes in response to an operation of the main switch.

* * * * *